March 31, 1953 W. F. SCOTT 2,633,033
IRONER UNIT
Filed Dec. 9, 1948 4 Sheets-Sheet 2

INVENTOR.
William F. Scott,
BY
Wilkinson, Huxley, Byron & Hume
Attys.

March 31, 1953     W. F. SCOTT     2,633,033
IRONER UNIT
Filed Dec. 9, 1948     4 Sheets-Sheet 3
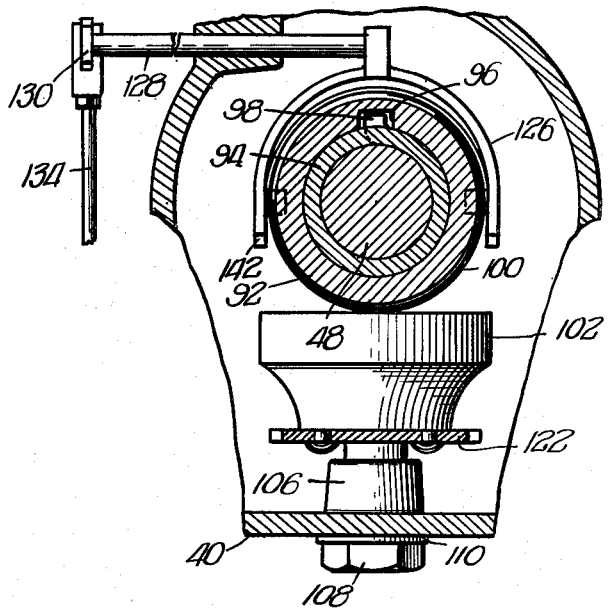
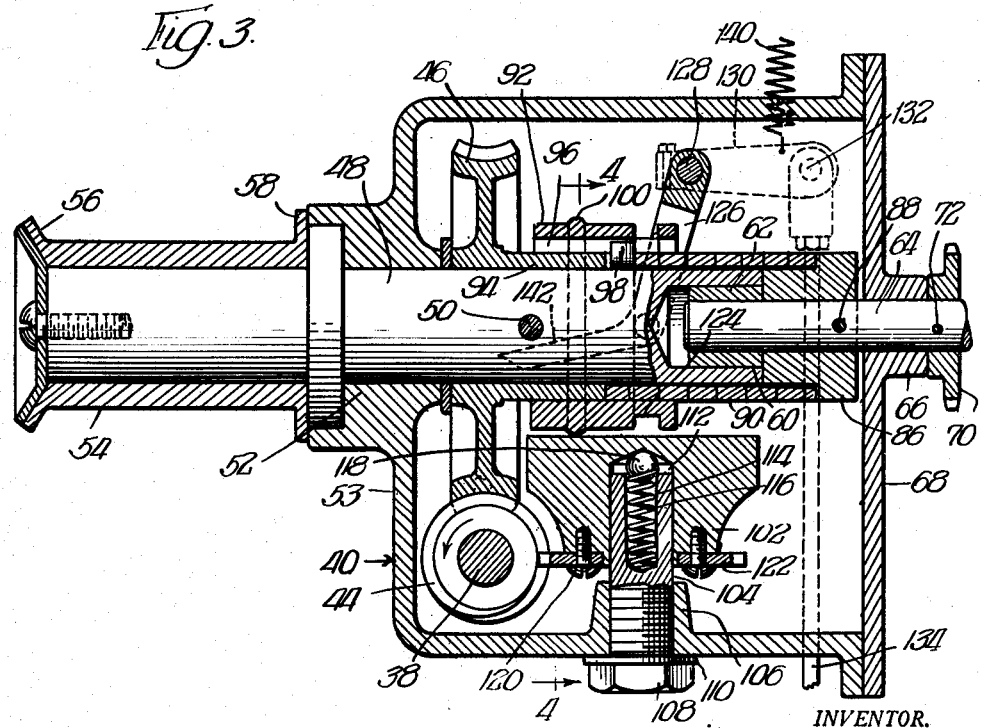
INVENTOR.
William F. Scott
BY
Wilkinson, Huxley, Byron & Hume
ATTYS

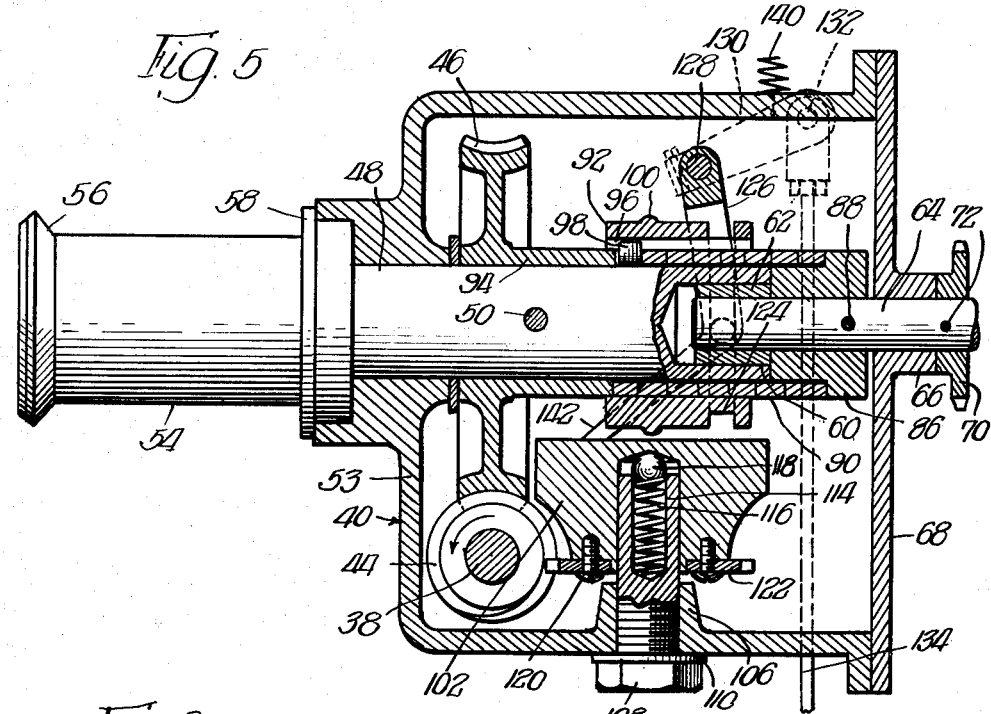

Patented Mar. 31, 1953

2,633,033

UNITED STATES PATENT OFFICE 2,633,033

IRONER UNIT

William F. Scott, Newton, Iowa, assignor to The Maytag Company, Newton, Iowa, a corporation of Delaware Application December 9, 1948, Serial No. 64,374

11 Claims. (Cl. 74—405)

The present invention relates to power transmitting devices and more particularly to such devices for use in ironer units and the like.

Among the objects of the present invention is to provide a power transmitting device wherein the power output may be readily and conveniently controlled with respect to the power input for driving any desired instrumentality at varying speeds.

Another object of the present invention is to provide a novel power transmitting device wherein means is provided on the output side for transmitting full power for operating any desired mechanism and additional means is provided on the output side thereof for transmitting variable power to some other mechanism in accordance with the adjustment of a variable speed device incorporated therein.

Still another object of the present invention is to provide a power transmitting device as immediately hereinabove described wherein a flexible frictional clutch device is incorporated in driving relation to said full power transmitting means on the output side thereof whereby power in varying amounts may be taken from the clutch device to operate any desired mechanism.

A further object of the invention is to provide a novel power transmitting device embodying a variable speed device therein whereby torque in varying amounts may be taken from the output side thereof for driving some instrumentality, such as the roll of an ironer unit at varying speeds, and wherein further means is provided on the output side thereof in the form of a flexible friction clutch mechanism whereby torque in varying amounts may be taken from said device for operating some instrumentality, as, for example, applying a shoe at varying pressures to said roll.

The present invention further contemplates the provision of novel control means for use in an ironer unit or the like which can be readily operated by an operator for controlling the power or torque transmitting device and its associated flexible friction clutch mechanism to vary the speed of the roll and to apply the shoe at varying pressures to said roll.

The present invention is further characterized as having novel means incorporated in the variable speed device whereby the drive therethrough is rendered inoperative in its zero torque transmitting position to facilitate the operation of any instrumentality connected in driving relation thereto at the output side thereof.

More particularly, the invention contemplates the provision of shifter mechanism for the variable speed device which, in one of its positions corresponding substantially to the zero torque transmitting position of said device, is adapted to effect a disengagement of the driving connection between certain elements thereof, thus facilitating the operation of any instrumentality connected in driving relation at the output side thereof.

Other objects, features, capabilities and advantages are comprehended by the invention, as will later appear and as are inherently possessed thereby.

Referring to the drawings:

Figure 3 is a vertical cross-sectional view taken through the power transmission mechanism for the ironer shown in Figures 1 and 2 of the drawings;

Figure 4 is a view in cross-section taken in the plane represented by line 4—4 of Figure 3 of the drawings;

Figure 5 is a vertical cross-sectional view similar to that of Figure 3 of the drawings showing the control mechanism in its neutral position;

Figure 6 is a diagrammatic view disclosing a suitable manual control for the ironer shoe of the ironer unit; and Figure 7 is a diagrammatic view showing a modified form of manual control for the ironer shoe of the ironer unit.

Figure 1:
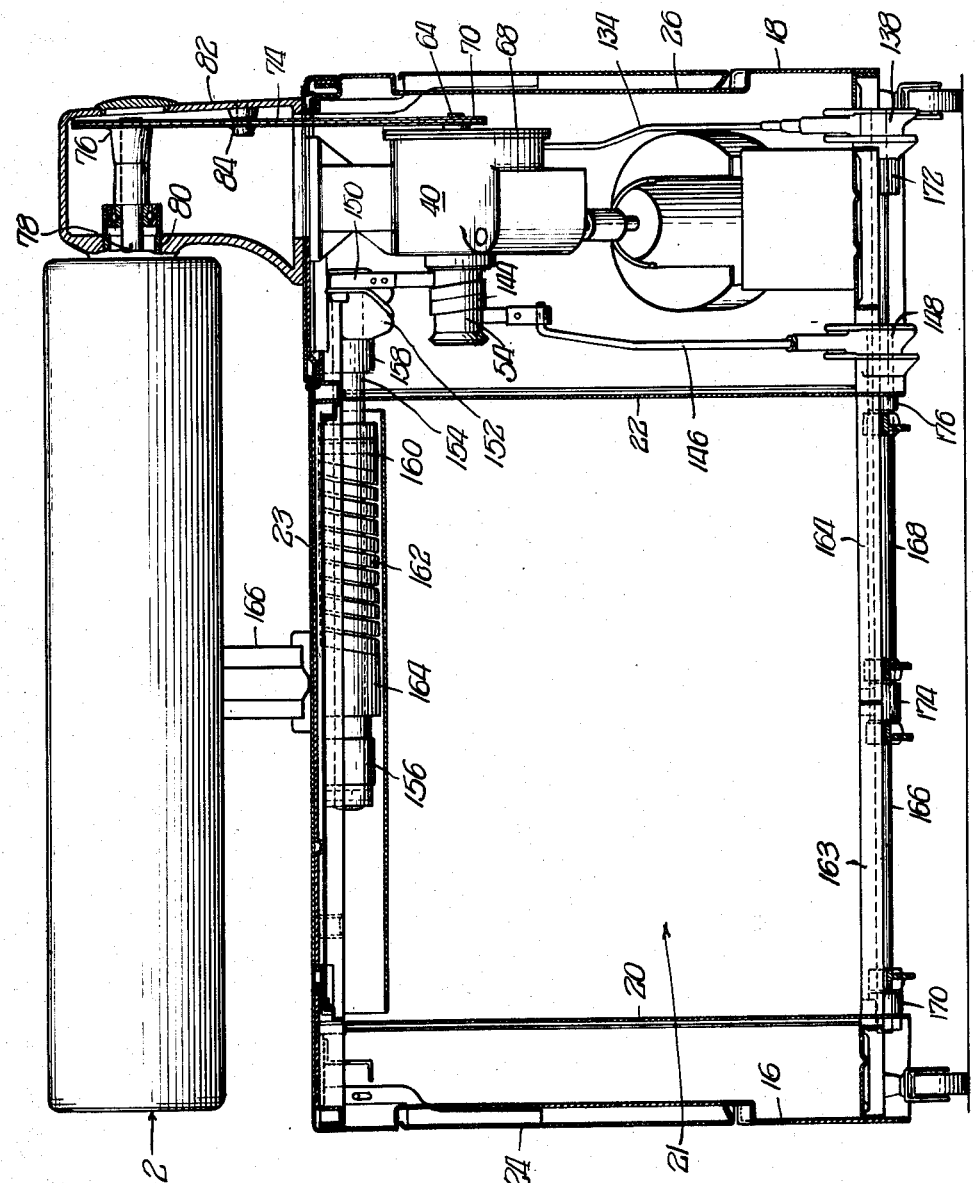
Figure 1 is a longitudinal cross-sectional view of an ironer unit embodying the present invention.
Figure 2:
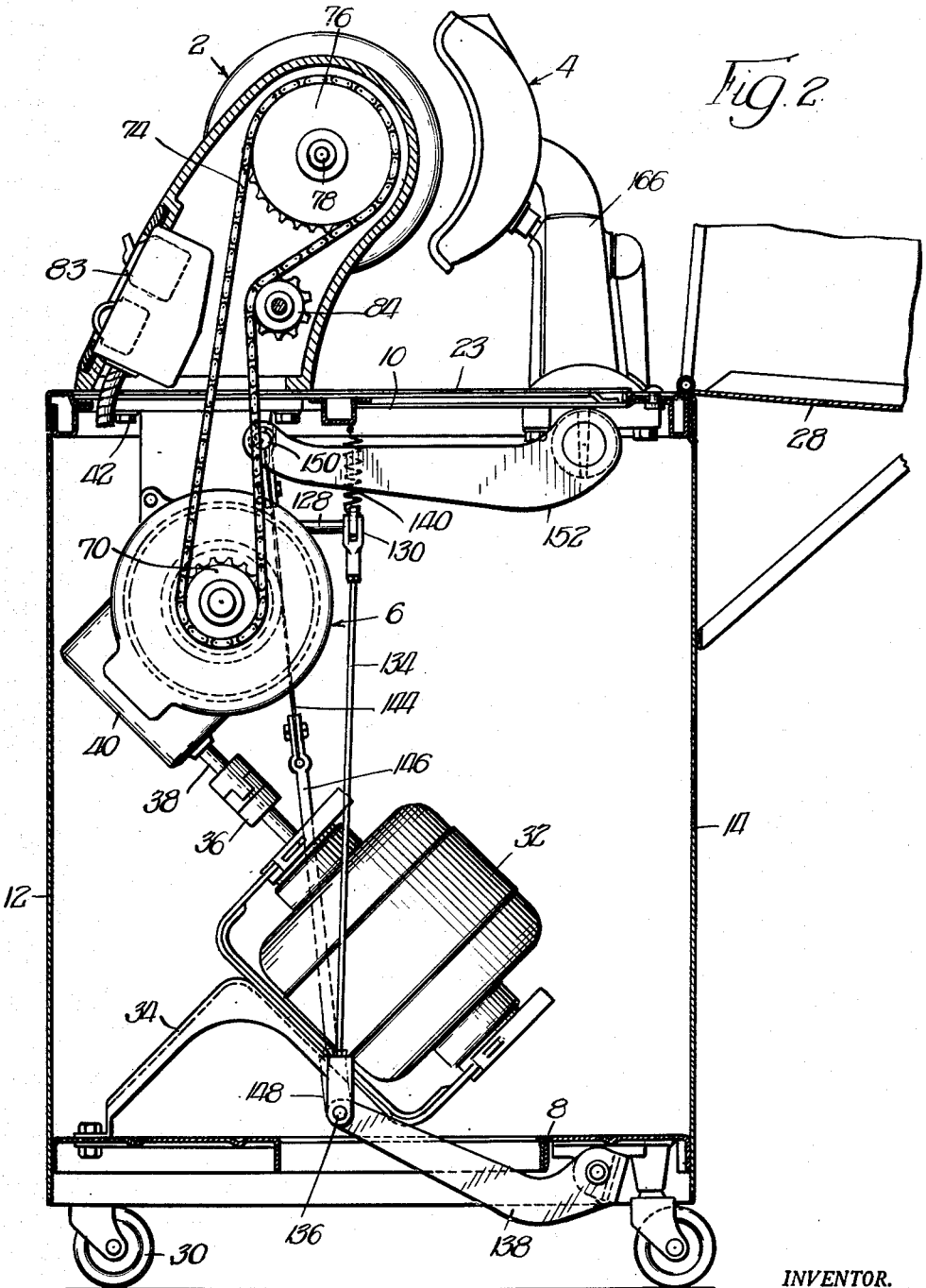
Figure 2 is a transverse vertical cross-sectional view taken in a plane adjacent the right hand end of the ironer unit shown in Figure 1 of the drawings.

Referring now more in detail to the drawings, an ironer unit embodying the present invention is disclosed in Figures 1 and 2 of the drawings as embodying a roll 2, a shoe 4, and power transmitting mechanism, generally referred to as 6, adapted to be controlled by an operator for rotating the roll 2 at varying speeds and for applying the shoe 4 at varying pressures to clothes and other such articles passing over the roll. The operating mechanisms for the ironer unit, including those specifically mentioned above, are mounted upon and supported by a frame structure which encloses certain of said mechanisms. This frame structure more particularly includes a bottom structural unit 8 and a top structural unit 10 interconnected by means of the front, back and side panels 12, 14 and 16 and 18, respectively, to form an enclosure partitioned vertically by the intermediate panels 20 and 22 to form the knee-hole 21 for the operator of the machine. A top panel 23 having suitable openings therein through which operating mechanism for the roll and shoe passes is provided in association with the top structural unit 10 and serves as a support for material being ironed. The side panels 16 and 18 are further formed with pivotally mounted trays 24 and 26, respectively, which when moved to their horizontal positions are adapted to serve as supports for clothing material, or the like, being ironed. The frame and cabinet construction is such that an operator seated in front of the machine may easily operate the controls for the roll and shoe by his or her feet while leaving the hands entirely free to handle the material being ironed by the machine. A cover 28, hinged at the rear of the cabinet structure, is provided for completely enclosing the roll and shoe when the machine is not in use. As shown, the ironer unit may be moved from place to place by means of the casters 30 located adjacent each of the corners of the cabinet structure and supported by means of the base structure 8.

The power transmitting mechanism includes a source of power, such as the motor 32 in the present illustration, mounted upon a bracket 34 secured to the base structure 8, and has the rotor shaft thereof coupled, as at 36, to the shaft 38. The shaft 38 is mounted in suitable bearings in a gear casing 40 secured, as by means of bolts 42, or the like, to the top frame structure 10. The shaft 38 is provided with a worm 44 adapted to mesh with and rotate the worm gear 46 secured to shaft 48 by means of a pin 50, or the like. The shaft 48 is mounted in the bearing 52 formed in the vertically disposed wall 53 of the housing 40 and a drum 54 is connected adjacent its outer end which is provided with the peripheral shoulders 56 and 58, for a purpose to be hereinafter more fully described. The opposite end of the shaft 48 terminates within the casing 40 and is counterbored at 60 to receive a bushing 62 providing a bearing for the inner end of a shaft 64 axially aligned with the shaft 48 and mounted in the bearing 66 provided in the vertically disposed wall 68 of the casing 40. The shaft 64 has a sprocket wheel 70 secured thereto by means of a pin 72, or the like, adjacent the bearing 66 which is engaged by a sprocket chain 74 extending upwardly through an opening provided in the top panel 23 and operates a sprocket wheel 76 fixed to the end of the center shaft 78 for the roll 2. This center shaft 78 adjacent the sprocket wheel 76 is suitably mounted in bearings 80 provided in the head 82, which is secured to and extends upwardly from the top frame structure 10 and top panel 23 and forms a housing for the driving mechanism for the roll 2. The proper tensioning of the chain 74 is effected through the idler sprocket wheel 84 rotatably mounted on a stub shaft extending inwardly from one of the side walls of the head 82. The head 82 has electric control means 83 mounted therein for energizing the drive motor 32 and the heating elements in the shoe 4.

Adjacent the inner end of the drive shaft 48 is a collar 86 secured to the driven shaft 64 by means of a pin 88, or the like. The diameter of the inner end of the collar 86 is the same as the diameter of the drive shaft 48 to receive the end portion of a spirally wound flexible clutch element 90 in embracing relation thereto which is connected or anchored to the collar in any desired manner. The major portion of the clutch element 90 surrounds the drive shaft 48 and, under normal conditions, sufficient clearance is provided between the same and the drive shaft 48 so that no turning movement can be transmitted from the drive shaft 48 to the driven shaft 64 therethrough.

In order to control the driven shaft 64 from zero to full speeds for varying the speed of rotation of the roll 2, a variable speed device is provided for controlling the free end of the flexible clutch element 90, whereby the frictional cooperation of the clutch element with the drive shaft 48 can be varied to provide a variable speed transmission between the drive shaft 48 and the driven shaft 64. This variable speed device comprises a combined friction wheel and collar 92 co-axially disposed with respect to the drive shaft 48 and rotatably mounted upon the extended hub portion 94 of the worm gear 46. This combined friction wheel and collar is movable axially with respect to the aligned shafts 48 and 64 and is provided with a longitudinally extending slot 96 adapted to continuously engage the up-standing lug 98 at the free end of the flexible clutch element 90 as the collar is moved axially along the hub extension 94 from one position to another. The outer periphery of the collar is provided with a raised wheel portion 100 disposed in rolling contact with a spring biased rotating disc 102. This friction disc 102 is rotatably mounted upon the end of a stub shaft 104 threadedly mounted in the hub 106 formed in the casing 40 and adjustably positioned by means of the nut 108 and the lock washer 110. The friction disc 102 and the stub shaft 104 are counterbored, as at 112 and 114, respectively, to receive a coil spring 116 which has one end engaging the counterbore 114 of the stub shaft 104 and the other end engaging the ball 118 disposed at the end of the counterbore 112 of the friction disc 102, whereby pressure is exerted upon the friction disc 102 to maintain a constant frictional engagement between the same and the raised wheel portion 100 of the collar 102. Secured to the lower end of the friction disc 102, as by means of the screws 120 or the like, is a worm gear 122 which meshes with and is driven by the worm 44.

It will be apparent that under operating conditions, the worm gears 46 and 122 are rotated at a constant speed by the worm 44 and that the friction disc 102 and drive shaft 48 are likewise rotated at a constant speed because of their connection to the worm gears 122 and 46, respectively. In order to vary the speed of the driven shaft 64, the collar 92 is moved axially with respect to the drive shaft 48 whereby the raised wheel portion 100 is moved from a central or neutral position with respect to the axis of rotation of the friction disc 102 to a point where the rotation of the raised wheel portion 100 is at a speed which coincides with the speed of the drive shaft 48. In order to move the collar 92 to effect this variation in speed of the raised wheel portion 100, the collar 92 is provided with an annular peripheral groove 124 engaged by a forked shifting lever 126 secured to the crank-shaft 128 mounted in the casing 40. The crank-shaft 128 extends outwardly of the casing 40 and has the operating lever 130 connected at one end thereof. The other end of lever 130 is pivotally connected, as at 132, to the link 134, which has its other end pivoted, as at 136, to the operating lever 138 disposed adjacent the lower bottom structural unit 8, which is operated in a manner to be presently described. The forked shifting lever 126 is urged in a counter-clockwise direction to move the raised wheel portion 100 into its neutral or central position with respect to friction disc 102, as shown in Figures 2 and 5 of the drawings, by means of the coil spring 140, which has one end connected to the operating lever 130 and its other end connected to the top structural unit 10 of the frame.

It is clear that as the operator causes the lever 138 to be moved, the forked shifting lever 126 is moved between the positions as shown in Figures 3 and 5 of the drawings, to move the collar 92, whereby the speed of rotation thereof is varied in accordance with its relative position with respect to the axis of rotation of the friction disc 102. Also as the raised wheel portion 100 is moved outwardly from the axis of rotation of the friction disc 102, the speed of rotation of the collar 92 is proportionately increased. As the speed of rotation of the collar 92 is changed, it causes the flexible clutch element 90 to grip the driving shaft 48 in proportion to its change in speed with the result that the speed of rotation of the driven shaft 64 is also varied. Thus, it will be seen that the speed of rotation of the driven member is exactly the same as the control collar, this being accomplished by limiting or controlling the amount of slippage between the drive shaft 48 and the cooperating portion of the friction clutch 90. It will be apparent that the speed of rotation of the collar 92 can never be greater than the circumferential speed of the friction disc 102 at the radius of contact of the raised wheel portion 100 therewith and, accordingly, the driven shaft 64 can never be driven at a rate different from the input speed of the friction disc.

The forked shifting lever 126 is provided with an extension 142 on one or both sides of the collar 92 which, when the collar 92 is in substantially its zero speed position, contacts the friction disc 102 and presses the same against the action of spring 114 to move the friction disc out of its engaging relation with the raised wheel portion 100. This is of particular importance for the reason that it permits manual movement of the ironer roll 2 without setting up reactive forces in the gear casing to oppose such movement.

Loosely wrapped about the drum 54 between the peripheral flanges 56 and 58 is a friction clutch element 144 which has one end thereof connected to a link 146 pivotally connected to a crank-arm or lever 148, the other end thereof being pivotally secured, as at 150, to one end of the lever 152 which is fixed at one end to crank-shaft 154 journaled in bearings 156 and 158 depending from the top frame structure 10. Rotary movement of the shaft 154 is transferred through a clutch 160 to one end of a spirally wound pre-loaded spring 162 mounted co-axially on the shaft 154. The opposite end of the spring 162 engages the hub 164 of a standard 166 pivoted for movement about shaft 154 and which pivotally carries the shoe 4 at its upper end.

As will be apparent, as the lever 148 is moved downwardly, the flexible clutch element 144 is tightened on the constantly rotating drum 54 whereby the lever 152 rotates the crank-shaft 154 which, through the medium of the spirally wound pre-loaded spring 162, moves the standard 166 to cause movement of the shoe 4 toward the roll 2. The friction between the drum 54 and the friction clutch element 144 multiplies the original downward force applied to the lever 148 to cause the shoe 4 to move against the ironer roll to apply the proper pressure for ironing. By controlling the proper amount of downward pressure on the lever 148, the pressure applied by the shoe to the roll may be varied. When the proper pressure is applied to the roll, the drum 54 slips, and continues to slip while, at the same time, maintaining the pressure between the roll and shoe. The spring 162 which acts as a resilient torque transmitting device also acts as a safety means for the mechanism described, for the reason that when the shoe 4 is moved into association with the roll 2, any force applied to the crank-shaft 154 above the pressure required by the shoe, is absorbed by the spring 162.

When downward pressure is removed from the lever 148, the same will release the tension of the clutch member 144 on the drum 54, thus permitting return movement of the shoe 4 away from the roll 2.

The crank levers 138 and 148 are controlled by foot pedals 163 and 164, respectively, mounted upon and fixed in relation to the concentrically arranged shafts 166 and 168, respectively, which extend longitudinally of the ironer unit and are journaled in suitable bearings depending from the bottom frame structure 8. The shaft 166 is journaled adjacent its ends in the bearings 170 and 172 and has the lever 138 connected to one end thereof which extends to the right beyond the bearing 172. The shaft 168, in the form of a sleeve, is journaled in the bearing 174 adjacent one end, and in the bearing 176 adjacent its other end, the said shaft or sleeve extending to the right beyond the bearing 176 and being connected to the lever 148.

The shoe 4, as well as the control for the clutch element 144 may be returned to their normal positions whereby the shoe is out of cooperative association with the roll 2 and the clutch element 144 is out of its gripping relation with the drum 54 by either of the two assemblies shown diagrammatically in Figures 6 and 7.

As shown in Figure 6, downward movement of the foot pedal 164 rotates sleeve 168 to move the crank-arm 148 downwardly to tighten the flexible clutch element 144 about the drum 54. This causes downward movement of the lever 152 which, through the action of the spring 162, causes the standard 166 to be pivoted about the shaft 154 to move the shoe 4 into pressing relation with the roll 2. In this arrangement for the control mechanism, when pressure is removed from the foot pedal 164, the lower crank-arm 148 moves upwardly under the action of the spring 178 to release the flexible clutch element 144 and, at the same time, the spring 180 causes the ironer shoe 4 to be moved away from the roll 2.

It is possible, however, to eliminate the pre-loaded spring 162 in the control mechanism, as illustrated in Figure 7 of the drawings, and to connect the crank-shaft 152 directly to the standard 166 for the ironer shoe 4 by providing a scale spring 182 between the crank-arm 148 and the clutch element 144 so that the drag of the clutch element can never exceed the pull of the spring 182. As in the illustration shown in Figure 6 of the drawings, the spring 180 is used in this modified form of control for releasing the shoe 4 from the roll 2 when pressure is removed from the foot pedal 164.

While I have herein described and upon the drawings shown an illustrative embodiment of the invention, it is to be understood that the invention is not limited thereto but may comprehend other constructions, arrangements of parts, details and features without departing from the spirit of the invention.

It is claimed:

1. In a power transmitting mechanism, the combination of a driving member and a driven member, a flexible clutch element of the coil type secured adjacent one end thereof to said driven member and adapted to frictionally engage said driving member, a variable speed device having a driven element operatively connected to the other end of said clutch element, said driven element encompassing said driving member and being adjustable axially with respect thereto, and means for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member.

2. In a power transmitting mechanism, the combination of driving means including a rotatable driving member, a rotatable driven member, a flexible clutch element of the coil type secured adjacent one end thereof to said driven member and adapted to frictionally engage said driving member, a variable speed device having a driven element operatively connected to the other end of said clutch element, said driven element encompassing said driving member and being adjustable axially with respect thereto, and means driven by said driving means for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member.

3. In a power transmitting mechanism, the combination of axially aligned driving and driven members, a flexible clutch element of the coil type embracing said members, said clutch element being secured adjacent one end thereof to said driven member and being adapted to frictionally engage said driving member, a variable speed device including frictionally cooperating driving and driven elements, said driven element being operatively connected to the other end of said clutch element, said driven element encompassing said members and being adjustable axially with respect thereto, said driven element having a frictional driving surface engaged peripherally by said driving element, means for moving said driven element into various axially adjusted positions to vary the frictional drive between said elements radially with respect to the axis of rotation of said driving element whereby the same is adapted to be driven at varying speeds, and means for rotating said driving element for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member.

4. In a power transmitting mechanism, the combination of driving means including a rotatable driving member, a rotatable driven member axially aligned with said driving member, a flexible clutch element of the coil type embracing said members, said clutch element being secured adjacent one end thereof to said driven member and being adapted to frictionally engage said driving member, a variable speed device including frictionally cooperating driving and driven elements, said driven element being operatively connected to the other end of said clutch element, said driven element encompassing said members and being adjustable axially with respect thereto, said driven element having a frictional driving surface engaged peripherally by said driving element, means for moving said driven element into various axially adjusted positions to vary the frictional drive between said elements radially with respect to the axis of rotation of said driving element whereby the same is adapted to be driven at varying speeds, and means driven by said driving means for rotating said driving element for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member.

5. In a power transmitting mechanism, the combination of a driving shaft, a worm and worm gear for driving said shaft, a driven shaft in alignment with said driving shaft, a helically wound spring clutch element embracing said driving and driven shafts, said spring being connected to said driven shaft at one end and being adapted to frictionally engage said driving shaft, a variable speed device including a friction disc and having a frictional driving surface, a collar slidably embracing said driving shaft and being connected to the other end of said spring, said collar having a raised wheel portion in peripheral driving contact with said disc, and means for adjustably moving said collar axially of said driving shaft and spring to vary the frictional driving rotation of said raised wheel portion radially with respect to the axis of rotation of said friction disc whereby said collar is adapted to be driven at varying speeds, and means driven by said worm for rotating said friction disc to rotate said collar at different speeds in its various axially adjusted positions to control the frictional contact pressure between said driving shaft and said spring clutch element to rotate said driven shaft in the same direction but at a speed equal to the speed of said collar, said collar having a maximum speed equal to that of said driving shaft.

6. In a power transmitting mechanism, the combination of a driving member and a driven member, a flexible clutch element of the coil type secured adjacent one end thereof to said driven member and adapted to frictionally engage said driving member, a variable speed device including frictionally cooperating driving and driven elements, said driven element being operatively connected to the other end of said clutch element, said driven element encompassing said members and being adjustable axially with respect thereto, said driven element having a frictional driving surface engaged peripherally by said driving element, means for moving said driven element into various axially adjusted positions to vary the frictional drive between said elements radially with respect to the axis of rotation of said driving element whereby the same is adapted to be driven at varying speeds, means for mounting said driving element for movement with respect to said driven element, resilient means for normally urging said driving element into driving contact with said driven element, means for rotating said driving element for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member, and means for moving said driving element out of driving contact with said driven element.

7. In a power transmitting mechanism, the combination of a driving member and a driven member, a flexible clutch element of the coil type secured adjacent one end thereof to said driven member and adapted to frictionally engage said driving member, a variable speed device including frictionally cooperating driving and driven elements, said driven element being operatively connected to the other end of said clutch element, said driven element encompassing said members and being adjustable axially with respect thereto, said driven element having a frictional driving surface engaged peripherally by said driving element, means for moving said driven element into various axially adjusted positions to vary the frictional drive between said elements radially with respect to the axis of rotation of said driving element whereby the same is adapted to be driven at varying speeds, means for mounting said driving element for movement with respect to said driven element, resilient means normally urging said driving element into driving contact with said driven element, means for rotating said driving element for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member, and means operating in accordance with the movement of said means for axially adjusting said driven element for moving said driving element out of driving contact with said driven element.

8. In a power transmitting mechanism, the combination of a driving member and a driven member, a flexible clutch element of the coil type secured adjacent one end thereof to said driven member and adapted to frictionally engage said driving member, a variable speed device including frictionally cooperating driving and driven elements, said driven element being operatively connected to the other end of said clutch element, said driven element encompassing said members and being adjustable axially with respect thereto, said driven element having a frictional driving surface engaged peripherally by said driving element, shifter means for moving said driven element into various axially adjusted positions to vary the frictional drive between said elements radially with respect to the axis of rotation of said driving element whereby said driven element is adapted to be driven at varying speeds, means for mounting said driving element for movement with respect to said driven element, resilient means normally urging said driving element into driving contact with said driven element, means for rotating said driving element for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member, and means carried by said shifter means effective when said frictional driving contact between said elements is in substantial alignment with the axis of rotation of said driving element for moving the same out of its driving relation with said driven element.

9. In a power transmitting mechanism, the combination of a driving member and a driven member, a flexible clutch element of the coil type secured adjacent one end thereof to said driven member and adapted to frictionally engage said driving member, a variable speed device including driving and driven elements having frictional driving contact with each other, means for operatively connecting said driven element to the other end of said clutch element, said driven element encompassing said members and being adjustable axially with respect thereto, said driven element having a frictional driving surface engaged peripherally by said driving element, shifter means for moving said driven element into various axially adjusted positions to vary the frictional drive between said elements radially with respect to the axis of rotation of said driving element whereby said driven element is adapted to be driven at varying speeds, means for mounting said driving element for movement with respect to said driven element, resilient means normally urging said driving element into driving contact with said driven element, means for rotating said driving element for rotating said driven element at different speeds in its various axially adjusted positions to control the frictional contact pressure between said driving member and said clutch element to rotate said driven member in the same direction but at a speed equal to the speed of said driven element, said driven element having a maximum speed equal to that of said driving member, and means operable in accordance with the movement of said shifting means for moving said driving element out of driving contact with said driven element when the driving contact between said elements is substantially in alignment with the axis of rotation of said driving element.

10. A variable speed device comprising a disc member having a substantially flat friction surface, a wheel member having peripheral frictional contact with said friction surface, means for rotating said disc member, resilient means for urging said disc member into frictional contact with said wheel member to effect a driving connection between said members, means for moving said wheel member radially of said disc member while in frictional contact therewith to vary the speed of rotation thereof, and means carried by said last mentioned means and movable therewith for contacting the friction surface of said disc to move the same out of frictional contact with said wheel member when said wheel member is disposed substantially at the axis of rotation of said disc member.

11. A variable speed device comprising a disc member having a substantially flat friction surface, a wheel member having peripheral frictional contact with said friction surface, means for rotating said disc member, resilient means for urging said disc member into frictional contact with said wheel member to effect a driving connection between said members, and shifting means including a shifting lever for moving said wheel member radially of said disc member while in frictional contact therewith to vary the speed of rotation thereof, said lever having an extension engageable with said disc member for moving the same out of its frictional contact with said wheel member when said wheel member is disposed substantially at the axis of rotation of said disc member.

WILLIAM F. SCOTT.

REFERENCES CITED

The following references are of record in the file of this patent:

UNITED STATES PATENTS

| Number | Name | Date |
|---|---|---|
| 429,153 | Porter | June 3, 1890 |
| 583,500 | Mueller | June 1, 1897 |
| 801,728 | Lindsay | Oct. 10, 1905 |
| 950,823 | Parkinson | Mar. 1, 1910 |
| 962,289 | Allen | June 21, 1910 |
| 1,088,466 | Sipple | Feb. 24, 1914 |
| 1,417,625 | Mikulasek | May 30, 1922 |
| 2,260,799 | Bush | Oct. 28, 1941 |
| 2,372,775 | Gerhardt et al. | Apr. 3, 1945 |
| 2,475,432 | Marihart | July 5, 1949 |

FOREIGN PATENTS

| Number | Country | Date |
|---|---|---|
| 343,557 | Canada | July 31, 1934 |
| 169,210 | Great Britain | Sept. 20, 1921 |